United States Patent [19]
Fishler et al.

[11] Patent Number: 6,032,267
[45] Date of Patent: *Feb. 29, 2000

[54] APPARATUS AND METHOD FOR EFFICIENT MODULARITY IN A PARALLEL, FAULT TOLERANT, MESSAGE BASED OPERATING SYSTEM

[75] Inventors: Leonard Richard Fishler, Cupertino; Thomas Marshall Clark, Santa Cruz, both of Calif.

[73] Assignee: Compaq Computer Corporation, Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/911,477

[22] Filed: Aug. 14, 1997

Related U.S. Application Data

[63] Continuation of application No. 08/377,302, Jan. 23, 1995, abandoned.

[51] Int. Cl.$^7$ ..................................................... G06F 13/00
[52] U.S. Cl. .............................................. 714/11; 714/18
[58] Field of Search ........................ 395/182.09, 182.13, 395/182.1, 182.11, 182.16, 182.14, 680, 681, 182.02, 182.08; 714/11, 16, 18, 4, 12

[56] References Cited

U.S. PATENT DOCUMENTS

| | | | |
|---|---|---|---|
| 4,402,431 | 9/1983 | Saadeh et al. | 371/67.1 |
| 4,649,473 | 3/1987 | Hammer et al. | 364/200 |
| 4,817,091 | 3/1989 | Katzman et al. | 371/9 |
| 4,956,771 | 9/1990 | Neustaedter | 364/200 |
| 5,093,920 | 3/1992 | Agrawal et al. | 395/800 |
| 5,224,215 | 6/1993 | Disbrow | 395/250 |
| 5,235,700 | 8/1993 | Alaiwan et al. | 395/575 |
| 5,245,704 | 9/1993 | Weber et al. | 364/200 |
| 5,257,374 | 10/1993 | Hammer et al. | 395/650 |
| 5,327,570 | 7/1994 | Foster et al. | 395/800 |
| 5,357,612 | 10/1994 | Alaiwan | 395/200 |
| 5,408,649 | 4/1995 | Beshears et al. | 371/8.1 |
| 5,649,092 | 7/1997 | Price et al. | 395/182.13 |

FOREIGN PATENT DOCUMENTS

| | | | |
|---|---|---|---|
| 0 444 376 | 9/1991 | European Pat. Off. | G06F 9/46 |
| 0 537 401 | 4/1993 | European Pat. Off. | G06F 15/16 |
| WO 91/17504 | 11/1991 | WIPO | G06F 11/20 |

OTHER PUBLICATIONS

Chapter 11 *Interprocess Communication* in Book entitled "Inside OS/2" by Gordon Letwin published by *Microsoft Press,* 1988, pp. 151–168.

*Primary Examiner*—Norman Michael Wright
*Attorney, Agent, or Firm*—Fenwick & West LLP

[57] ABSTRACT

A parallel, fault-tolerant computer system in which data is transferred between processes in a single CPU by two methods. In a first method, the data is copied each time it is transferred. In a second method, the data is not copied, but is passed through a shared memory, queueing system. The first method is used to ensure fault-tolerance and linear expandability. The second method is used to minimize the time required for inter-process communication. Use of the shared memory queueing system allows for increased vertical and horizontal modularity for processes executing in a same CPU.

10 Claims, 13 Drawing Sheets

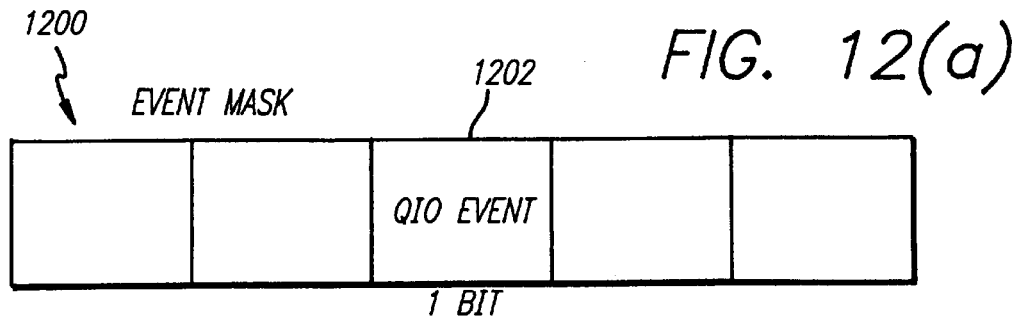
FIG. 12(a)
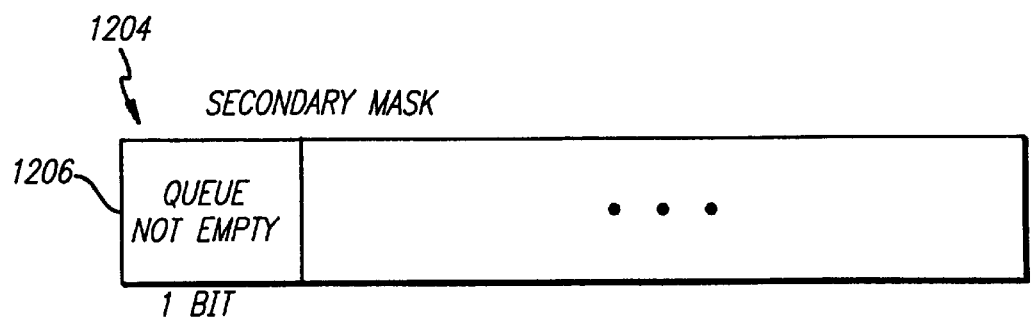
FIG. 12(b)
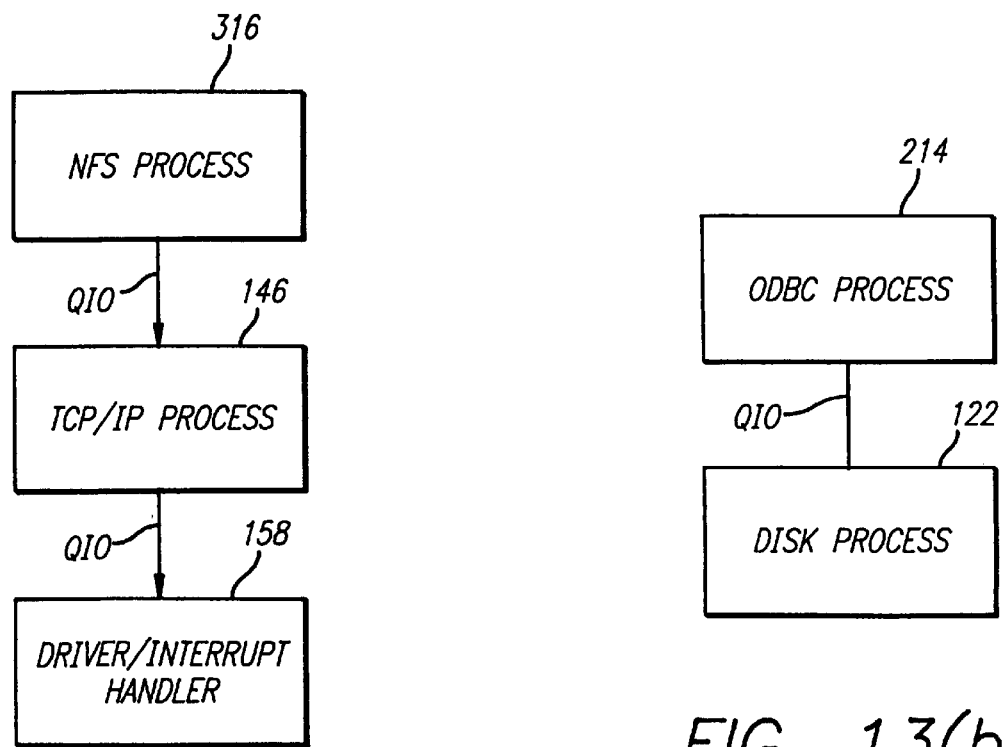
FIG. 13(a)
FIG. 13(b)

APPARATUS AND METHOD FOR EFFICIENT MODULARITY IN A PARALLEL, FAULT TOLERANT, MESSAGE BASED OPERATING SYSTEM

This application is a continuation of application Ser. No. 08/377,302, filed Jan. 23, 1995, now abandoned.

BACKGROUND OF THE INVENTION

This invention relates to operating system software and, more particularly, to a method and apparatus for increasing the modularity of the operating system without substantially decreasing the efficiency or reliability of the data processing system.

This application is related to an application entitled "Apparatus and Method for Efficient Transfer of Data and Events Between Processes and Between Processes and Drivers in a Parallel, Fault Tolerant, Message Based Operating System," of Fishler and Clark (U.S. application Ser. No. 08/377,303), filed concurrently with this application, and which is herein incorporated by reference.

This application is filed with three Appendices, which are a part of the specification and are herein incorporated by reference. The Appendices are:

Appendix A: Descriptions of QIO library routines for a shared memory queueing system.

Appendix B: A description of socket calls supported in a preferred embodiment of the invention.

Appendix C: A list of QIO events occurring in a preferred embodiment of the present invention.

Conventional multiprocessor computers and massively parallel processing (MPP) computers include multiple CPUs, executing the same instructions or executing different instructions. In certain situations, data passed between the processors is copied when it is passed from one processor to another. In conventional fault tolerant computers, for example, data is backed up and checkpointed between the CPUs in furtherance of the goals of fault tolerance, linear expandability, and massive parallelism. Thus, in fault tolerant computers, data is duplicated between CPUs and if one CPU fails, processing can be continued on another CPU with minimal (or no) loss of data. Such duplication of data at the processor level is highly desirable when used to ensure the robustness of the system. Duplication of data, however, can also slow system performance.

In some conventional systems, data is transferred between software processes by a message system in which data is physically copied from one process and sent to the other process. This other process can either be executing on the same CPU or on a different CPU. The messaging system physically copies each message and sends each message one at a time to the receiving process.

When the copied data is used for purposes of checkpointing between processors, for example, it is desirable that the data be physically copied. At other times, however, the data is merely passed between processes to enable the processes to communicate with each other. In this case, there is no need to physically copy the data when the processes reside in the same CPU. At such times, it may take more time to copy and transmit the data between processes than it takes for the receiving process to actually process the data. When data is transferring between processes executing on the same CPU, it is not efficient to copy data sent between the processes.

Traditionally fault-tolerant computers have not allowed processes or CPUs to share memory under any circumstances. Memory shared between CPUs tends to be a "bottleneck" since one CPU may need to wait for another CPU to finish accessing the memory. In addition, if memory is shared between CPUs, and if one CPU fails, the other CPU cannot be assured of a non-corrupt memory space. Thus, conventionally, messages have been copied between processes in order to force strict data integrity at the process level.

On the other hand, passing data between processes by duplicating the data is time-consuming. To improve execution time, programmers tend to write larger processes that incorporate several functions, instead of breaking these functions up into more, smaller processes. By writing fewer, larger processes, programmers avoid the time-delays caused by copying data between processes. Large processes, however, are more difficult to write and maintain than smaller processes. What is needed is an alternate mechanism for passing data between processes in certain circumstances where duplication of data takes more time than the processing to be performed and where duplication of data is not critical for purposes of ensuring fault tolerance.

SUMMARY OF THE INVENTION

The present invention provides an apparatus and method for improving the modularity of an operating system in a fault tolerant, message based operating system without substantially affecting the efficiency or reliability of the operating system. In the present invention, processes can communicate with each other through two distinct methods. First, processes can communicate with each other using a conventional message system, where data is copied each time it is transferred between processes. This first method is used primarily for functions relating to fault tolerance, linear expandability and parallelism where it is desirable, or at least acceptable, to duplicate the data being transferred. Second, processes can communicate with each other by using a shared memory queueing system (sometimes shortened to "shared memory", "queued I/O" or "QIO"). This method is used primarily for functions relating to server processing, LAN protocol processing, and transmitting data between processes running on same processor.

The shared memory queueing system allows processes executing on the same processor to transmit data without copying the data each time it is transferred. This increase in inter-process speed makes it possible to divide the processes into small functional modules. Process modularity can be "vertical," e.g., a single large process can be broken down into several smaller processes with a minimum loss of time lost due to transferring data between the processes. Process modularity can also be "horizontal," e.g., various client processes can access one server process through the shared memory queueing system.

BRIEF DESCRIPTION OF THE DRAWINGS

The invention will now be described with reference to the accompanying drawings, wherein:

FIGS. 12(a) and 12(b) show masks used by the shared memory queueing system during a QIO event.

FIGS. 13(a) and 13(b) show examples of vertical modularity achieved with the present invention.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense. In general, the same reference numbers will be used for the same or similar elements.

Figure 1:
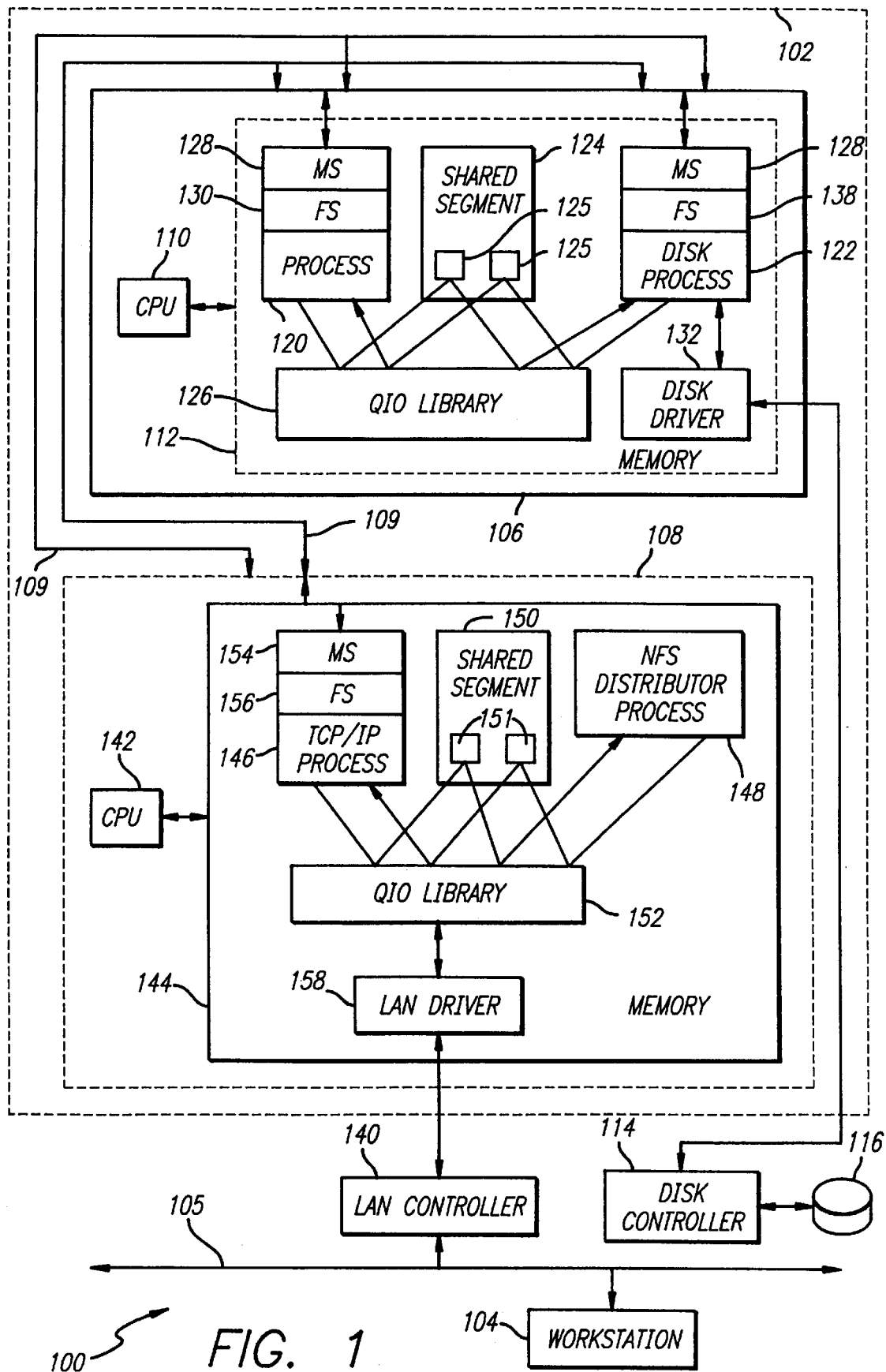
FIG. 1 is a block diagram showing a fault tolerant, parallel data processing system incorporating a shared memory queueing system.

FIG. 1 is a block diagram showing a fault tolerant, parallel data processing system 100 incorporating a shared memory queueing system. FIG. 1 includes a node 102 and a workstation 104 that communicate over a Local Area Network (LAN) 105. Node 102 includes a processor 106 and a processor 108, connected by Inter Processor or Bus (IPB) 109. IPB 109 is a redundant bus, of a type known by persons of ordinary skill in the art. Although not shown in FIG. 1, system 100 is a fault tolerant, parallel computer system, where at least one processor checkpoints data from other processors in the system. Such a fault tolerant system is described generally in, for example, in U.S. Pat. No. , 4,817,091 to Katzman et al., which is herein incorporated by reference. The present invention, however, can be implemented on a variety of hardware platforms without departing from the scope of the invention.

It should be understood that the "processes" shown in FIG. 1 and throughout this document preferably are implemented as software program instructions that are stored in memory and performed by a CPU. Similarly, "drivers" are understood preferably to be implemented as software program instructions that are stored in memory and performed by a CPU. References to a process being "in" a processor or a CPU generally means that the process is stored in memory of the CPU and is executed by the CPU.

Processor 106 includes a CPU 110 and a memory 112 and is connected to a disk controller 114 and a disk drive 116. Memory 112 includes a software process 120, a software disk process 122, and a shared memory segment 124, which includes queues 125, as discussed below. Processes 120 and 122 access shared memory segment 124 through a QIO library routines 126. Messages sent using the shared memory segment and QIO library 126 are sent without duplication of data.

Process 120 communicates over IPB 109 through use of a message system (MS) 128 and a file system (FS) 130. The message system 128 is described in, e.g., "Introduction to Guardian 90 Internal Design," Chapter 6, Tandem Part No. 024507. File system 130 is described in, e.g., "Guardian Programer's Guide," Tandem Part No. 096042 and "System Procedure Calls Definition Manual," Vol. 1 and 2, Tandem Part Nos. 026148 and 026149, each of which is incorporated by reference.

Disk process 122 sends data to disk 116 through a software disk driver 132 and disk controller 114. Node 102 is connected to LAN 105 through a LAN controller 140. A processor 108 of node 102 includes a CPU 142 and a memory 144. Memory 144 includes a TCP/IP process 146 and an NFS distributor process 148, which communicate through a shared memory segment 150 by use of QIO library routines 152. As described below, shared memory segment 150 includes a plurality of queues 151.

TCP/IP process 146 communicates with PB 109 through a message system 154 and a file system 156, as described above. TCP/IP process 146 communicates with LAN controller 140 through a software LAN driver 158 by way of QIO library 152. Again, communication using shared memory segment 150 does not involve copying data, while communication using message system 154 and file system 156 does involve copying data. Although not shown in FIG. 1, some implementations of the present invention also may use message system 154 and file system 156 to communicate between processes in a single processor. For example, process 120 may also communicate with disk process 122 using the file and message systems.

Thus, FIG. 1 shows a shared memory queueing system to be used for communication between processes 120, 122 and between processes 146, 148. FIG. 1 also shows communication using a shared memory queuing system between process 146 and LAN driver 158.

Figure 2:
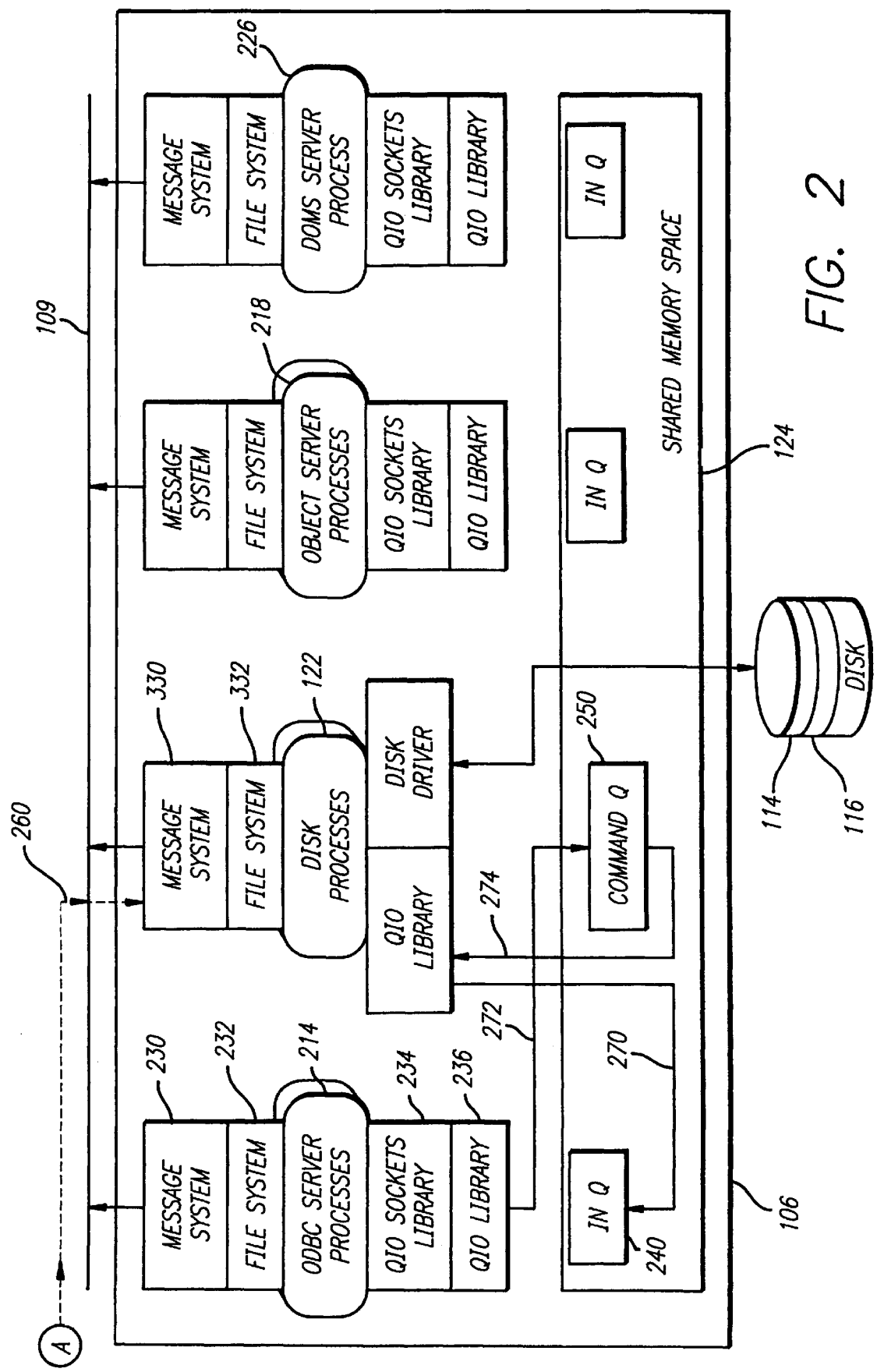
FIG. 2 is a block diagram showing a first processor of FIG. 1.

FIG. 2 is a block diagram showing processor 106 of FIG. 1. FIG. 2 shows four types of processes: a plurality of ODBC Server processes 214, a plurality of Disk processes 122, a plurality of Object Server processes 218, and a DOMS Distributor process 220. "ODBC" stands for "Open Database Connectivity." ODBC is a database client/server methodology that conforms to a standard for remote SQL database access, promoted by Microsoft Corporation. "DOMS" stands for "Distributed Object Management System" and is a CORBA compliant distributed object management server. Each of processes 214, 122, 218, and 220 has an associated message system 230, a file system 232, a QIO sockets library 234, and a QIO library 236. (Libraries 234 and 236 are subsets of library 126 of FIG. 1). Examples of the contents of libraries 234 and 236, are shown in Appendices A and B.

FIG. 2 shows a first method of sending messages between processes, which involves copying the data of messages. Message 260 of FIG. 2 is received on IPB 109 from a process of processor 108 via message system 230 by Disk process 122. This type of message also can be sent between any of the processes in a single processor. For example, it may be desirable that a process be able to reside on any processor. In that case, the process must be able to receive messages both from processes in other processors and processes in the same processor and must send and receive message through its message system 230.

FIG. 2 also shows a second method of sending messages between processes, in which messages are sent by way of the shared memory queuing system. In FIG. 2, process 214 has an associated queue 240 holding messages 270 from other processes (e.g., from process 122). The details of such a queue are discussed below in connection with FIGS. 9–11. Each of processes 214, 218, and 220 has an associated input queue. Process 122 has an associated command queue 250 that holds messages 272 sent by other processes.

Figure 3:
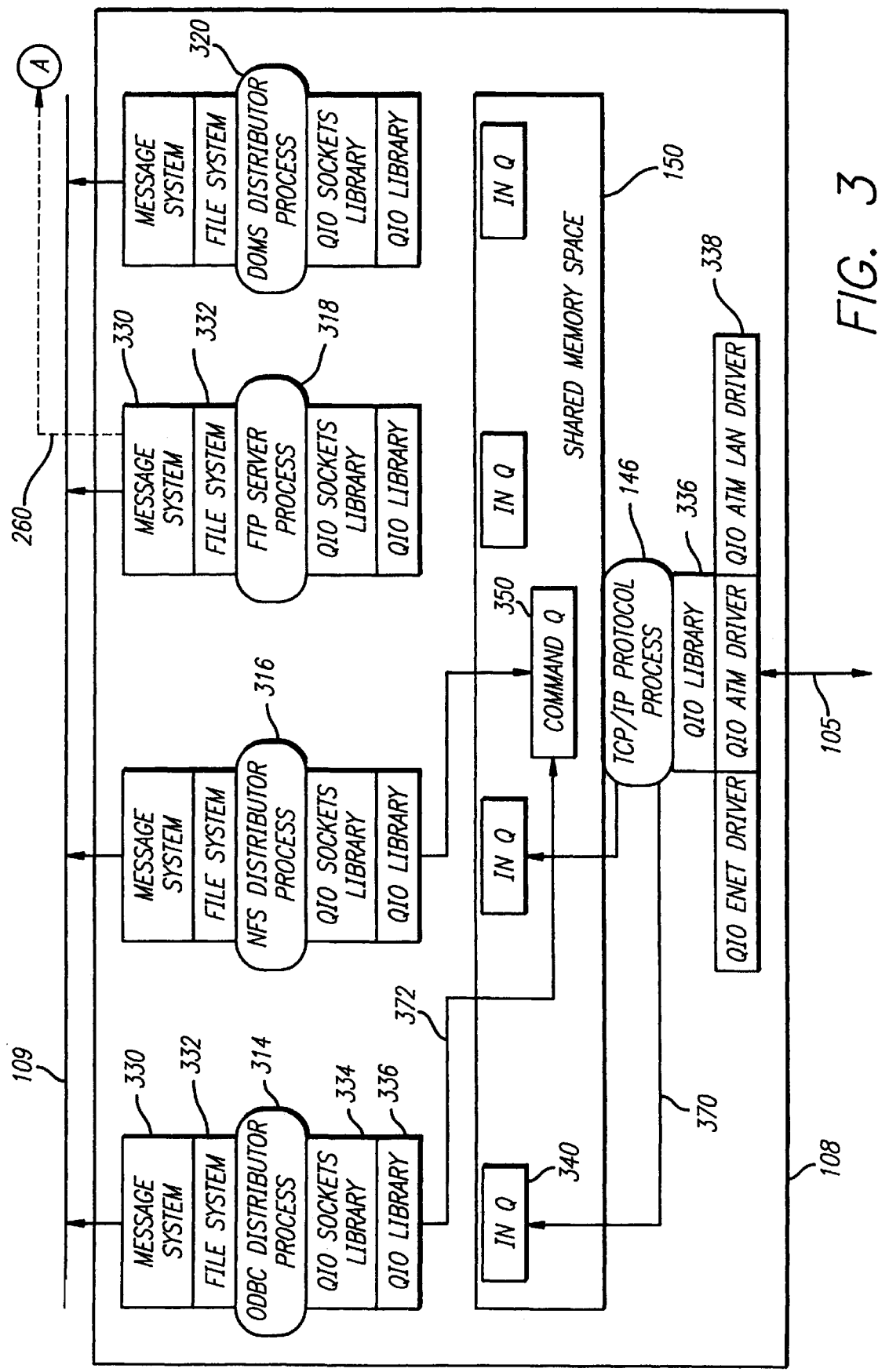
FIG. 3 is a block diagram showing a second processor of FIG. 1.

FIG. 3 is a block diagram showing processor 108 of FIG. 1 including shared memory segment 150. FIG. 3 shows five processes: an ODBC Distributor process 314, an NFS Distributor process 316, an FTP Server process 318, a DOMS Distributor process 320, and a TCP/IP Protocol process 146. "NFS" stands for "Network File System," which is a remote file server standard of Sun Microsystems, Inc. FIP stands for "File Transfer Protocol," which is a communications protocol used for transferring data between computer systems. "TCP/IP" stands for "Transmission Control Protocol/Internet Protocol" and is a communications protocol used to communicate between nodes.

Each of processes 314, 316, 318, and 320 has an associated message system 330, a file system 332, a QIO sockets library 334, and a QIO library 336. (Libraries 334 and 336 are subsets of QIO library 152 of FIG. 1). Examples of the contents of library 336, which is used to access shared memory 150, are shown in Appendix A. Examples of the contents of library 334 are shown in Appendix B.

TCP/IP Protocol process 146 has an associated QIO library 336 for accessing shared memory 150 and three I/O drivers 338. Drivers 338 also communicate with TCP/IP process 146 using the shared memory queueing system in a manner shown in FIGS. 4 and 5.

FIG. 3 shows messages 260 being sent to a process in another processor by way of message system 330 and file system 332. Specifically, FIG. 3 shows a message 260 being sent from process 318 to a disk process 122 shown in FIG. 2 over IPB 109. Thus, messages are sent between processes in processors 106 and 108 using the messaging system Messages can also be sent between processes within processor 108 using the messaging system. As discussed above, the message system 330 duplicates data when it sends a message.

FIG. 3 also shows a second method of sending messages between processes within a single processor and between processes and drivers within a single processor. In this second method, messages are sent by way of the shared memory queueing system. In FIG. 3, process 314 has an associated queue 340 holding messages 370 from other processes (e.g., from process 146). The details of a queue are discussed below in connection with FIGS. 9–11. Each of processes 314, 316, 318, and 320 have an input queue associated therewith. Process 146 has an associated command queue 350 that holds messages 372 sent by other processes.

FIGS. 2 and 3 demonstrate how use of a shared memory queueing system encourages "horizontal modularity" and "vertical modularity" of processes. Because there is little overhead involved in transmitting data to or from a processor a driver when using the shared memory queueing system, a programmer can easily break a function down into individual processes such as the processes shown in FIGS. 2 and 3. Vertical modularity involves a higher level process, such as process 214, communicating with a lower level process, such as process 122. Horizontal modularity involves a plurality of processes, such as processes 314, 316, 318 and 320, communicating with the same lower level process, such as process 146.

Figure 4:
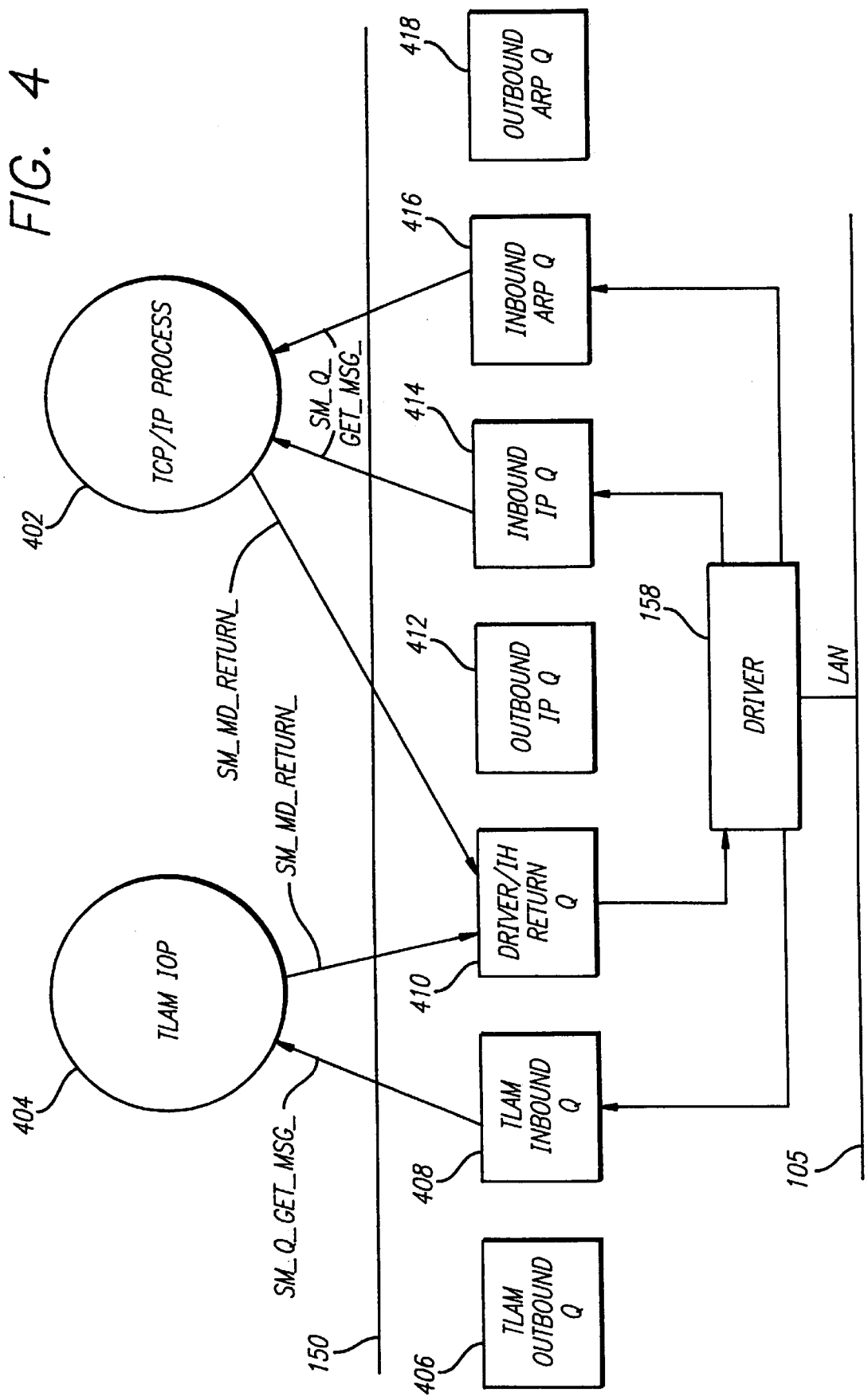
FIG. 4 shows how a TCP/IP process and a TLAM IOP (Tandem LAN Access Method I/O Process) each receive messages from a LAN by way of a shared message queueing system.
Figure 5:
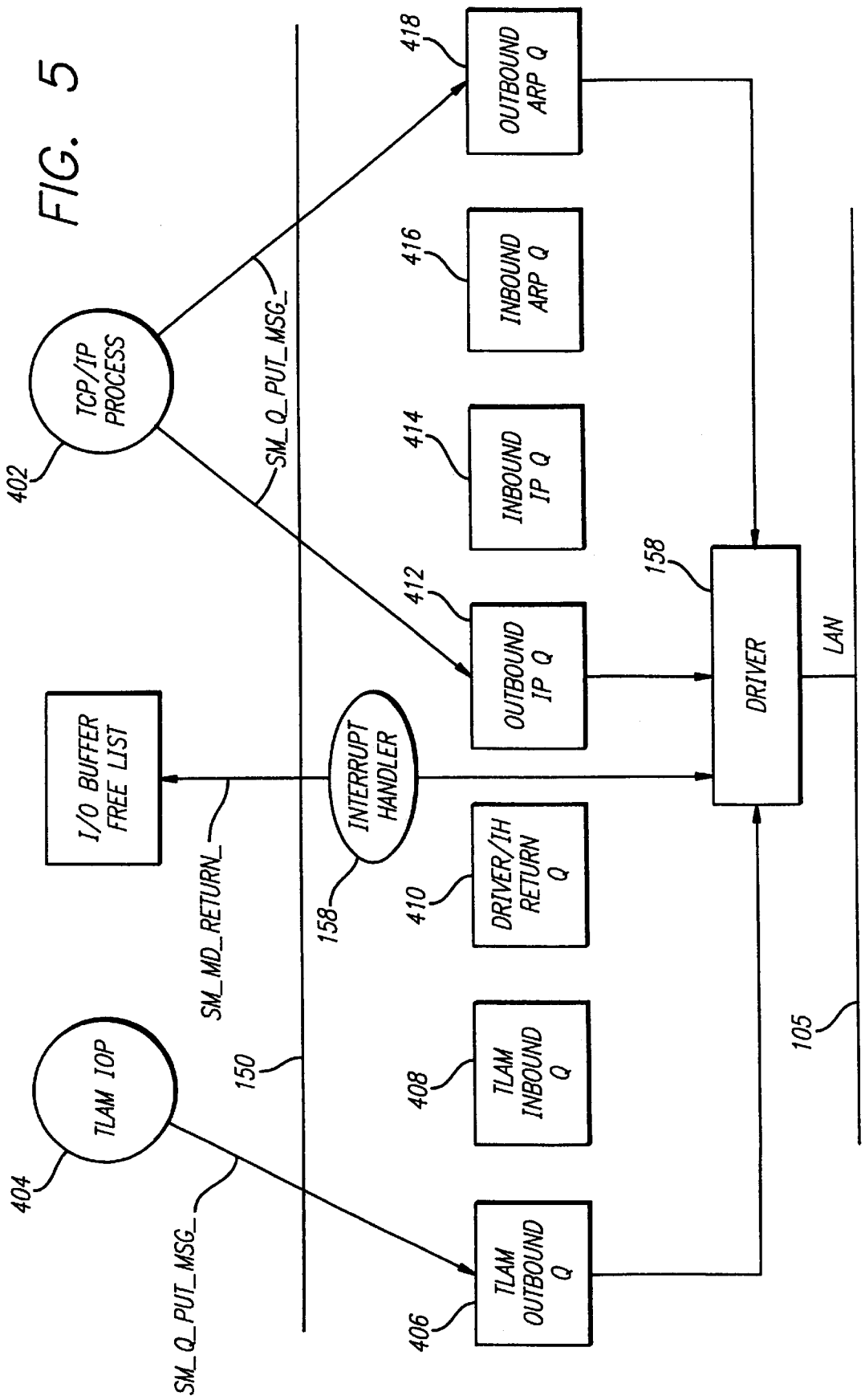
FIG. 5 shows how the TCP/IP process and the TLAM IOP each send messages to the LAN by way of the shared message queueing system.

FIGS. 4 and 5 show examples, respectively, of two processes receiving messages over LAN 105 by way of a driver that accesses the shared memory queueing system. FIG. 5 also shows the processes sending messages over LAN 105 by way of the same driver. In each of the examples of FIGS. 4 and 5, it is assumed that certain set-up functions have been previously performed. For example, each process has "registered" itself with the shared memory queueing system and has received a module ID (see "SM_MODULE_ID_CREATE" of the QIO library routines in Appendix A). The processes use their unique module ID for all interactions with the shared memory queueing system. At registration, each process has an option of defining what percentage of shared memory it is allowed to consume. In a preferred embodiment, a process is a allowed to consume up to 100% of the shared memory as a default. Each process also requests "pool space" from the shared memory queueing system. The pool is used as a "private" space for the process to allocate data structures, such as control buffers.

Each process also registers itself with LAN driver 158 through, e.g., a call to the SM_DR_REGISTER routine of Appendix A. This routine registers a process with a designated LAN and with a designated port. The routine also creates an input queue and an output queue in shared memory for the process and returns a queue ID to the process for each queue created. Thus, in FIG. 4, TCP/IP process 402 registers twice to obtain inbound and outbound ARP queues and inbound and outbound IP queues. An inbound queue is used to receive messages from LAN 105. As is described above in connection with FIGS. 2 and 3, a process also may have other input and output queues for, e.g., communicating with other processes and/or other drivers. These queues are created through SM_Q CREATE of Appendix A. The outbound queue is used to hold message descriptors for data to be sent to LAN 105. The driver/interrupt handler 158 maintains a table stored in memory that is used to route inbound messages to the correct inbound queue. A client process can then retrieve messages from its inbound queue.

FIG. 4 shows how a TCP/IP process 402 and a TLAM IOP (Tandem LAN Access Method I/O Process) 404 each receive messages from LAN 105 by way of the shared message queueing system. TCP/IP process 402 uses known TCP/IP protocol and receives both IP and ARP messages. Thus, TCP/IP process 402 has two inbound queues and two outbound queues. TLAM IOP 404 uses an industry standard interface for accessing a LAN. TLAM IOP 404 is based on the IEEE 802.2 Logical link control standard and supports Type 1 connectionless service as well as the MULTILAN NETBIOS protocol "MULTILAN" is a trademark of Tandem Computers, Inc. Thus, TLAM IOP 404 can connect to various types of LANs.

Figure 9:
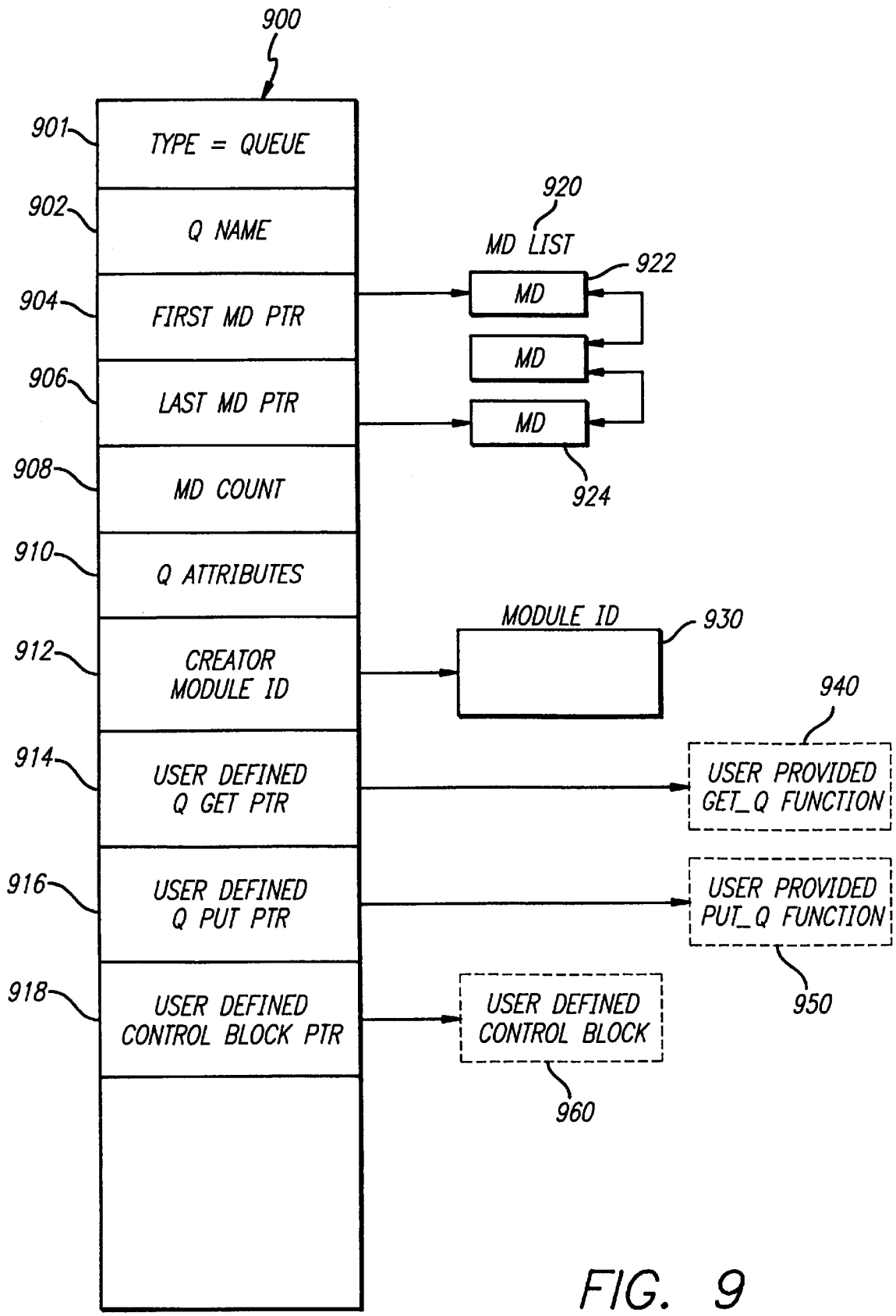
FIG. 9 shows a format of a queue in the shared memory queueing system.

When driver 158 receives a message from LAN 105, it places the message on an inbound queue for a correct process and awakens the process that is identified in that queue's creator module ID field (see FIG. 9). Thus, for example, in FIG. 4, an incoming message may be placed in either a TLAM inbound queue 408, an inbound IP queue 414, or an inbound ARP queue 416. The driver/interrupt handler 158 looks at the table stored in memory to determine in which queue to place an incoming message, depending on the recipient indicated by the message, and to determine which process to awaken.

Processes are awakened with a "QIO event". A QIO event uses the computer's operating system to set a QIO bit in an event mask, such as that shown in FIG. 12(a) and a bit in a QIO secondary mask (see FIG. 12(b) to indicate that the process's queue is not empty. When an event occurs, the operating system wakes up the receiving process, i.e., the process goes from a wait state to a ready state. If the event mask 1200 has a QIO bit 1202 set, the process checks the QIO secondary mask 1204. When the "QUEUE_NOT_EMPTY" bit 1206 is set, the process consumes data from an associated queue. Examples of QIO events are shown in Appendix C.

A process consumes messages from an inbound queue by calling, e.g., SM_Q_GET_MSG of Appendix A. This routine gets a message from the top of the queue. Driver 158 sets up the inbound queue so that the return queue pointer 1022 (see FIG. 10) points to the driver's return queue 410. Thus, the process simply calls, e.g., SM_MD_RETURN of Appendix A to return the buffer to driver 158 for reuse.

FIG. 5 shows how TCP/IP process 402 and TLAM IOP 404 send messages to LAN 105 by way of the shared message queueing system. To send a message, a process calls, e.g., SM_Q_PUT_MSG of Appendix A, which invokes the PUT routine in the outbound queue specified. This places the message on an outbound queue defined by the driver. The process may, but is not required to, indicate a return queue so that driver 158 will return the message after it is sent. Thus, when TLAM IOP 404 calls SM_Q_PUT_MSG, the message to be sent invokes the "PUT" routine of TLAM outbound queue 406. Similarly, when TCP/IP 402 calls SM_Q_PUT_MSG for an ARP message, the message to be sent invokes the "PUT" routine of outbound ARP queue 418. When TCP/IP 402 calls SM_Q_PUT_MSG for an IP message, the message to be sent invokes the "PUT" routine of outbound IP queue 412.

In a preferred embodiment, driver 158 does not place the message on the queue but first checks to see if the message can be sent to LAN 105. If so, driver 158 sends the message. Otherwise, driver 158 places the message on a queue internal to the driver. When an interrupt occurs, driver 158 checks whether there are outgoing messages queued. If so, the driver removes the message from its internal queue and sends it. The message buffer is returned to the buffer free list if no return queue was specified in the queue structure.

When a process wants to disconnect from LAN 105 it calls, e.g., SM_DR_DEREGISTER of Appendix A. This routine deletes the inbound and outbound queues for the process and removes the process from the driver's internal routing table.

Figure 7:
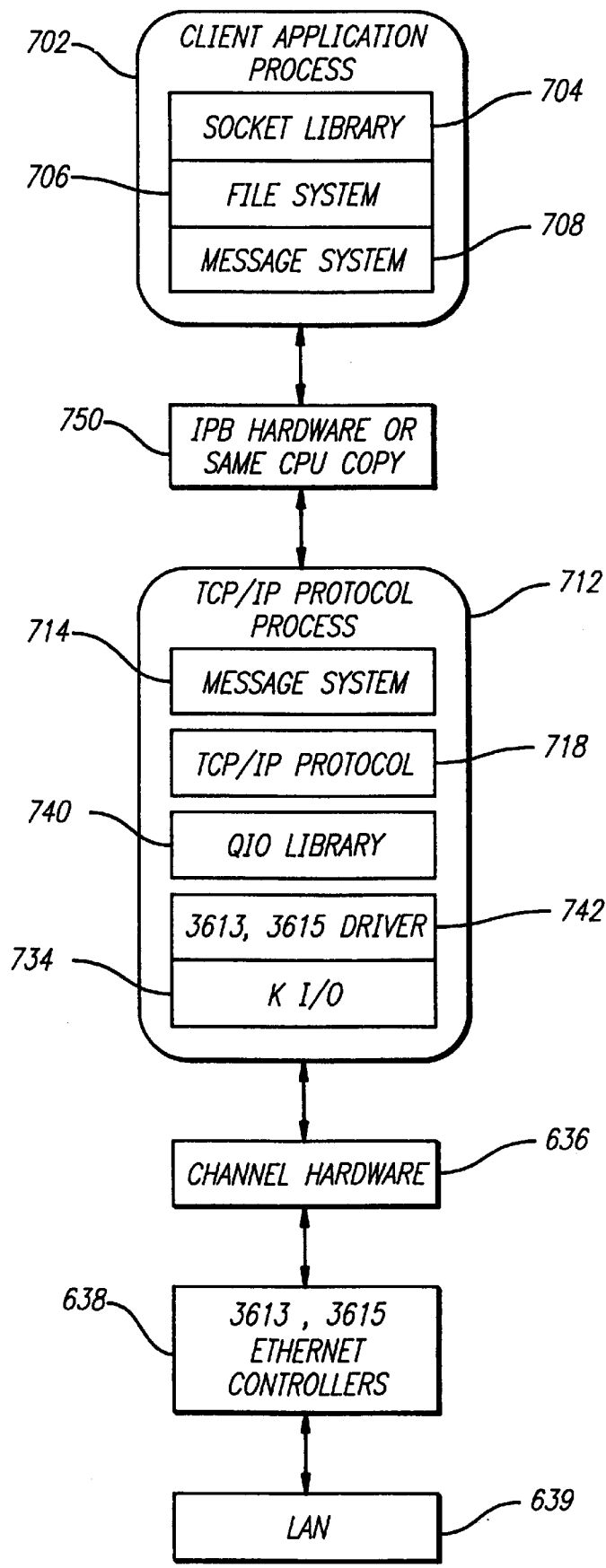
FIG. 7 shows a data path of data output from an application process to a LAN in a first embodiment of the present invention.
Figure 8:
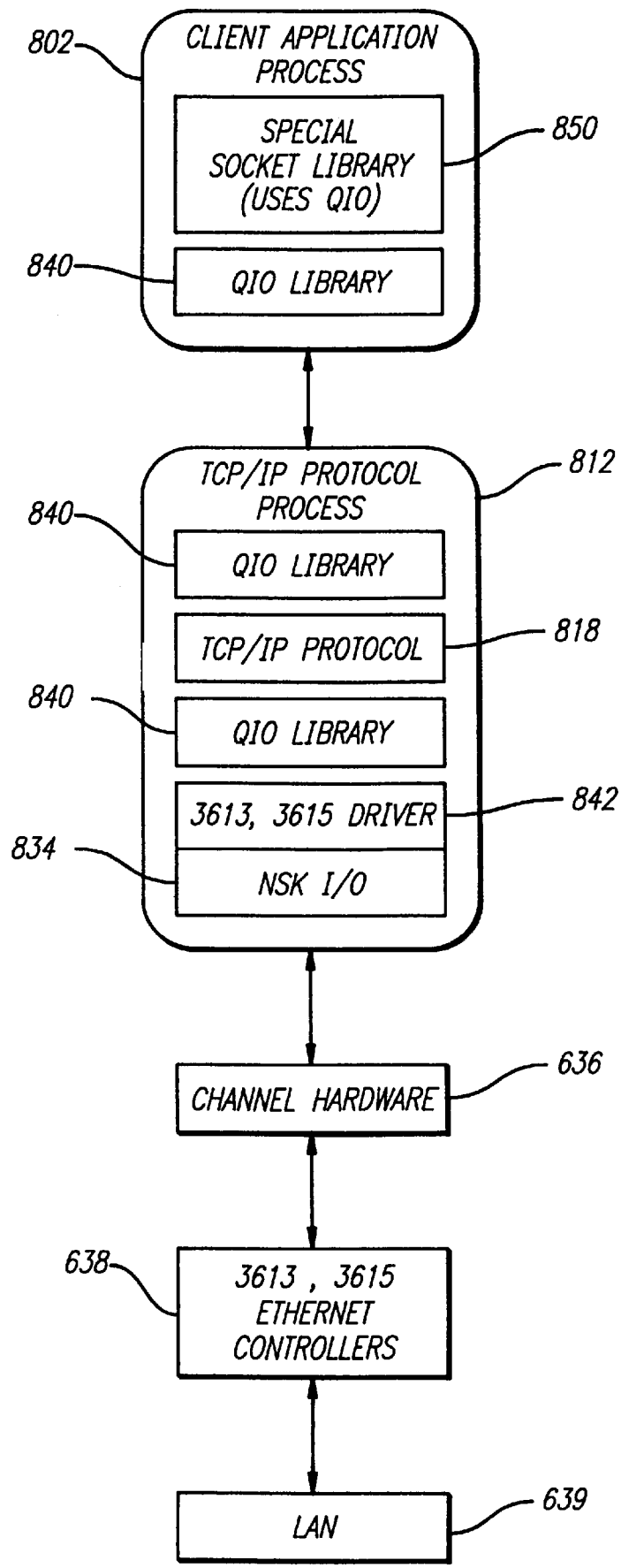
FIG. 8 shows a data path of data output from an application process to a LAN in a second embodiment of the present invention.

The shared memory queueing system of the present invention allows improvements in the content and organization of processes in the system and improves the efficiency of data paths travelled by data in the system. For example, the present invention allows an efficient implementation of the OSI seven-layer communication protocol, which is used to send and receive data over a LAN using TCP/IP. The following discussion of FIGS. 6–8 shows how use of a shared memory queueing system increases the speed and efficiency of implementation of the OSI model in a fault tolerant computer system.

Figure 6:
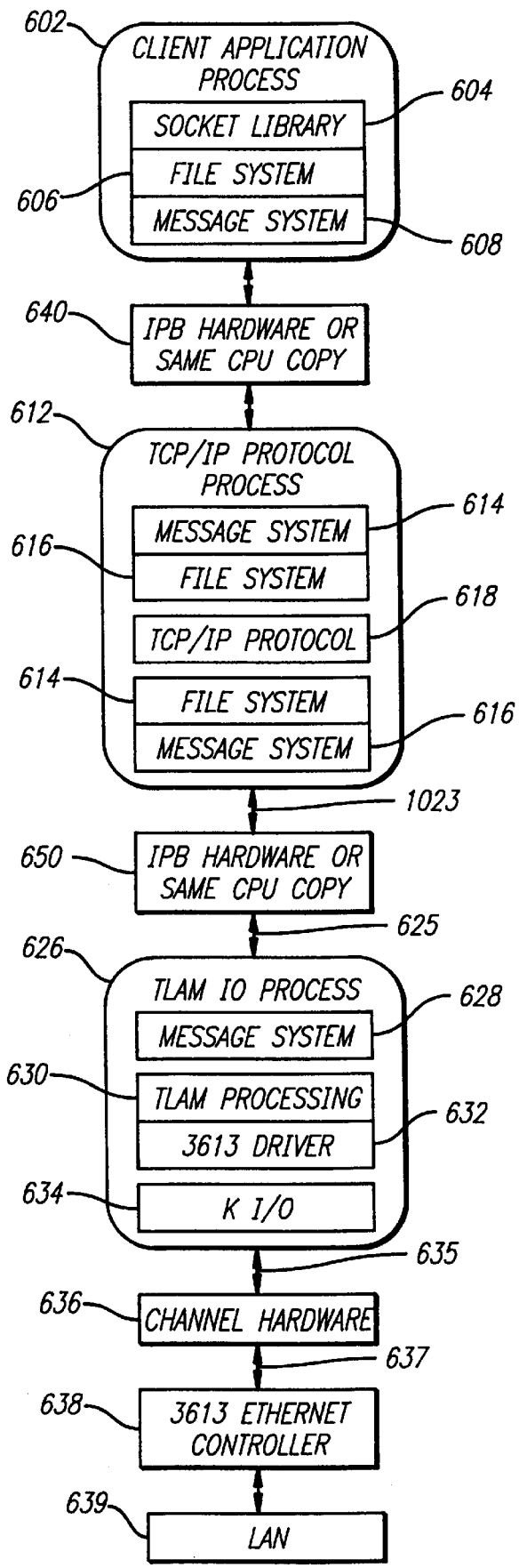
FIG. 6 shows a data path of data output from an application process to a LAN in a system that does not include a shared memory queueing system.

FIG. 6 shows a data path for transmitting data between an application process 602 and an Ethernet LAN 639 in a system that does not include shared memory queueing. Client application process 602 includes a socket library 604, a file system 606, and a message system 608. Message system 608 sends data to a TCP/IP protocol process 612, which can be either in the same processor or in another processor. Transmission to the same processor is effected by copying the data and transmitting it to message system 614 of TCP/IP process 612. Transmission to another processor is effected by copying the data and transferring it over IPB 109 (see FIG. 1), where it is copied again before being handed to TCP/IP process 612.

TCP/IP process 612 includes a message system 614, a file system 616, and a TCP/IP protocol procedure 618. Message system 614 and file system 616 are shown twice to indicate that they are used both for input to process 612 and for output from process 626. Message system 626 sends data to a TLAM I/O process 626, which can be either in the same processor or in another processor. Transmission to the same processor is effected by copying the data and transmitting it to messaging system 628 of TLAM I/O process 626. Transmission to another processor is effected by copying the data and transferring it over IPB 109, where it is copied again before being handed to TLAM I/O process 626.

TLAM I/O process 626 includes message system 628, a TLAM procedure 630, a 3613 driver 632, and a kernel I/O driver 634. Driver 634 passes data to channel hardware 636, which passes the data to an Ethernet controller 638. Ethernet controller 638 passes the data to the LAN 639. A disadvantage of the data path of FIG. 6 is that the data must be copied at least once each time it is passed through the message system, i.e., at 640, 650.

FIG. 7 shows a data path for transmitting data between an application process 702 and LAN 639 in a first embodiment of the present invention, including both a messaging system and a shared memory queueing system. Client application process 702 includes a socket library 704, a file system 706, and a message system 708. Message system 708 sends or receives data to or from a TCP/IP protocol process 712, which can be either in the same processor or in another processor. Transmission to the same processor is effected by copying the data and transmitting it to message system 712 of TCP/IP process 714. Transmission to another processor is effected by copying the data and transferring it over IPB 109, where it is copied again before being handed to the process.

TCP/IP process 712 includes message system 714, and a TCP/IP protocol procedure 718. Message system 714 is used to send and receive data from process 702. In FIG. 7, data is sent and received from TCP/IP process 712 to driver 742 in the manner shown in FIGS. 4 and 5. Thus, in the present invention, data passes through the message system fewer times and data is copied fewer times (i.e., at point 750) during transmission, resulting in a time savings and more efficient processing when sending and receiving data from a LAN.

FIG. 8 shows a data path data for transmitting data between an application process 802 and LAN 639 in a second embodiment of the present invention. Client application process 802 includes a special socket library 850 and a QIO library 840. Process 802 queues data through the socket library and the QIO library. To receive data through the shared memory queueing system, TCP/IP process 812 must be in the same processor as process 802. Transmission to and from another processor is effected by copying the data and transferring it over IPB 109 via the message system of FIG. 1 (not shown in FIG. 8). Transmission between processes in the same processor generally is effected through the shared memory queueing system.

TCP/IP process 812 retrieves messages from the queueing system through routines in its QIO library 840. Thus, in the second embodiment, data passes through the message system only when it is desirable to duplicate the data (such as for checkpointing and backup purposes) and/or when the data is sent over IPB 109. This reduced copying of data results in a great time savings and efficiency in implementing inter-process communication between processes in a single processor that send and receive messages (e.g., as in a network multimedia application that sends and receives large amounts of data over a LAN.)

FIG. 9 shows a format 900 of a queue in the shared memory segments 124, 150. Queue 240 of FIG. 2, for example, has the format of FIG. 9. A queue includes a descriptor type 901, a human readable queue name 902, a first message descriptor (MD) pointer 904, a last message descriptor pointer 906, a message descriptor count 908, queue attributes 910, a creator module ID 912, a pointer 914 to a user-defined "GET-Q" function 940, a pointer 916 to a user-defined "PUT-Q" function 950, and a pointer 918 to a user-defined control block 960.

Descriptor type 901 indicates that this data structure is a queue. Queue name 902 is a name of the queue, such as "ODBC DIST IN Q". First message descriptor (MD) pointer 904 points to a first message descriptor 922 of a first message in a doubly linked list of messages 920. Last message descriptor pointer 906 points to a first message descriptor 924 of a last message in doubly linked list 920. The format of a message is described below in connection with FIGS. 10 and 11.

Message descriptor count 908 holds the number of messages in the doubly linked list 920. Queue attributes 910 includes attributes of the queue, e.g., whether a process should be awakened when data is PUT to its inbound queue. Creator module ID 912 is an ID of a module (or process) that created the queue. The shared memory system generally awakens this process whenever a queue has become non-empty (see, e.g., FIG. 4 and 5). Pointer 914 points to a user-defined "GET-Q" function. The GET-Q function is a function that is performed whenever a GET function is performed to get information from the queue. It allows the user-defined function to be performed in addition to or instead of a standard "GET" function in the QIO library. For example, if the queue is an inbound queue for an I/O driver, a user-defined GET function might initiate an I/O operation by the driver. The driver may also keep track of a number of outstanding I/Os and may adjust this number whenever a GET (or PUT) is performed. As another example, a GET may cause a housekeeping routine to be performed by the process that created the queue.

Pointer 916 points to a user-defined "PUT-Q" function, which is performed whenever a PUT function is performed to put information into the queue. It allows the user-defined function to be performed in addition to or instead of a standard "PUT" function. For example, in a queue associated with a LAN driver, the PUT-Q function may invoke a transport layer routine to output information to LAN 105. Pointer 918 points to a user-defined control block 960. Often this control block is a control block needed by one or both of the PUT-Q and GET-Q functions. For example, the control block might be a control block for a driver that outputs information when the information is sent to the queueing system.

Figure 10:
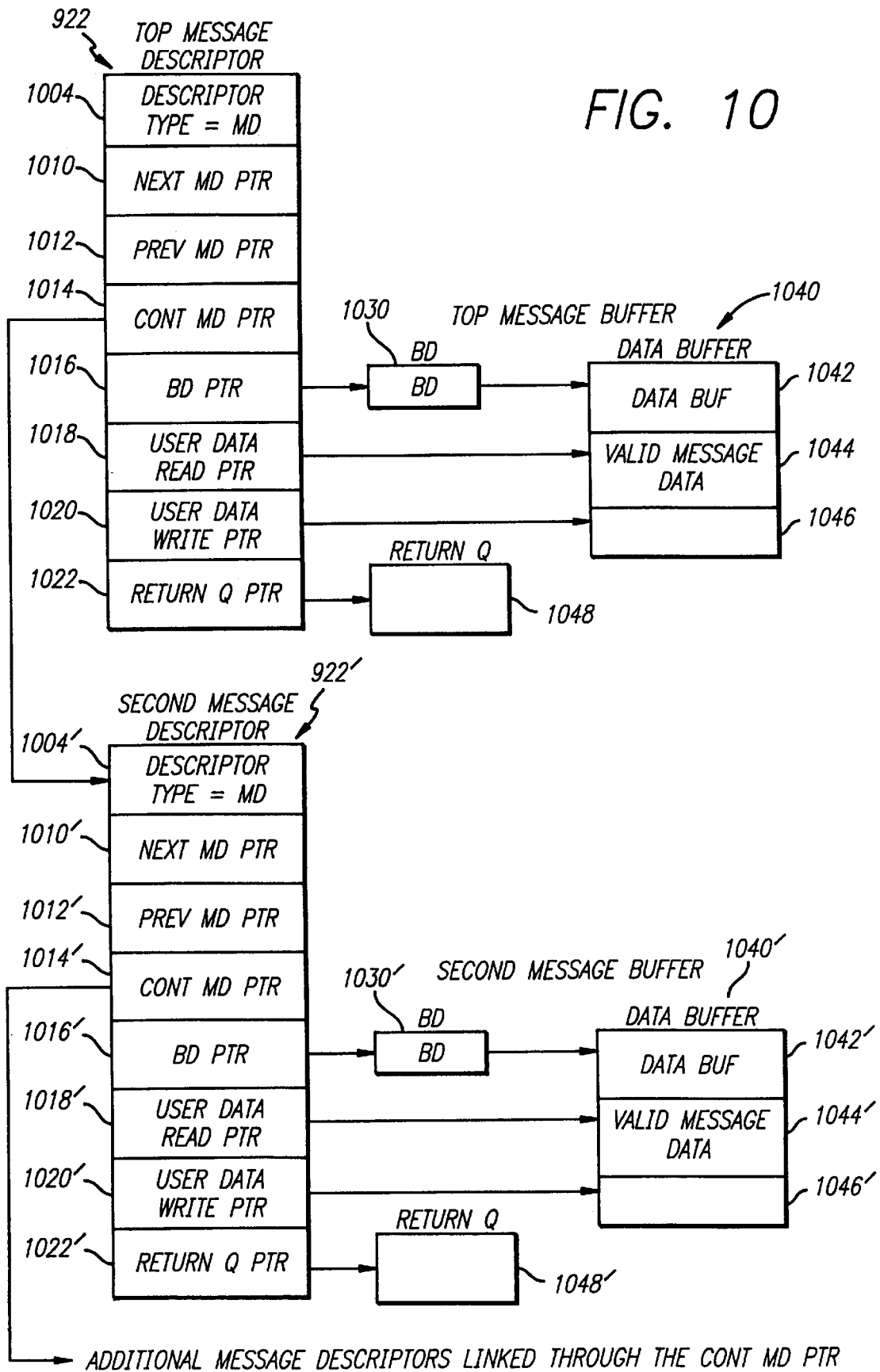
FIG. 10 shows a format of a message stored in the queue of FIG. 9.

FIG. 10 shows a format of a message stored in doubly linked list 920 of FIG. 9. A message is made up of linked message descriptors. Messages (made up of one or more linked message descriptors) are then linked together as shown in list 920 of FIG. 9. FIG. 10 shows message descriptors 922 and 922', which are joined in a linked list by pointers 1014 and 1014' to form a message. A message descriptor includes a descriptor type 1004, a next message descriptor pointer 1010, a previous message descriptor pointer 1012, a continued message descriptor pointer 1014, a buffer descriptor (BD) pointer 1016, a user data read pointer 1018, a user data write pointer 1020, and a return queue pointer 1022.

In FIG. 10, message descriptors 922 and 922' form a single message. Descriptor type 1004 indicates that the descriptor is a message descriptor. Next message descriptor pointer 1010 points to the first message descriptor of a next message stored in doubly linked list 920. Previous message descriptor pointer 1012 points to the first message descriptor of a previous message stored in doubly linked list 920. Continued message descriptor pointer 1014 points to a next message descriptor in the current message. Scattered data needs multiple message descriptors and a single message may be formed of multiple message descriptors pointing to data in different buffer locations. Buffer descriptor (BD) pointer 1016 points to a buffer descriptor 1030, which is described in more detail below in connection with FIG. 11. Buffer descriptor 1030 points to a data buffer 1040.

User data read pointer 1018 is a pointer into buffer 1040 indicating a location 1044 in data buffer 1040 where reading should commence (or has stopped). User data write pointer 1020 is a pointer into buffer 1040 indicating a location 1046 in data buffer 1040 where writing should commence (or has stopped). Return queue pointer 1022 points to a return queue. When a message is returned, via the shared memory queueing system (i.e., when processing of the message is complete), the returned message is placed on the return queue if a return queue is specified. For example, the current process may need to count messages sent. Instead of putting the message into a "free memory pool" when it is removed from the queue, the message is placed on the return queue for further processing by the current process. Other message descriptors in a message may have different, secondary return queue pointers 1022' or no return queue pointers. These secondary return queue pointers are processed by individual processes associated with the primary return queue.

Figure 11:
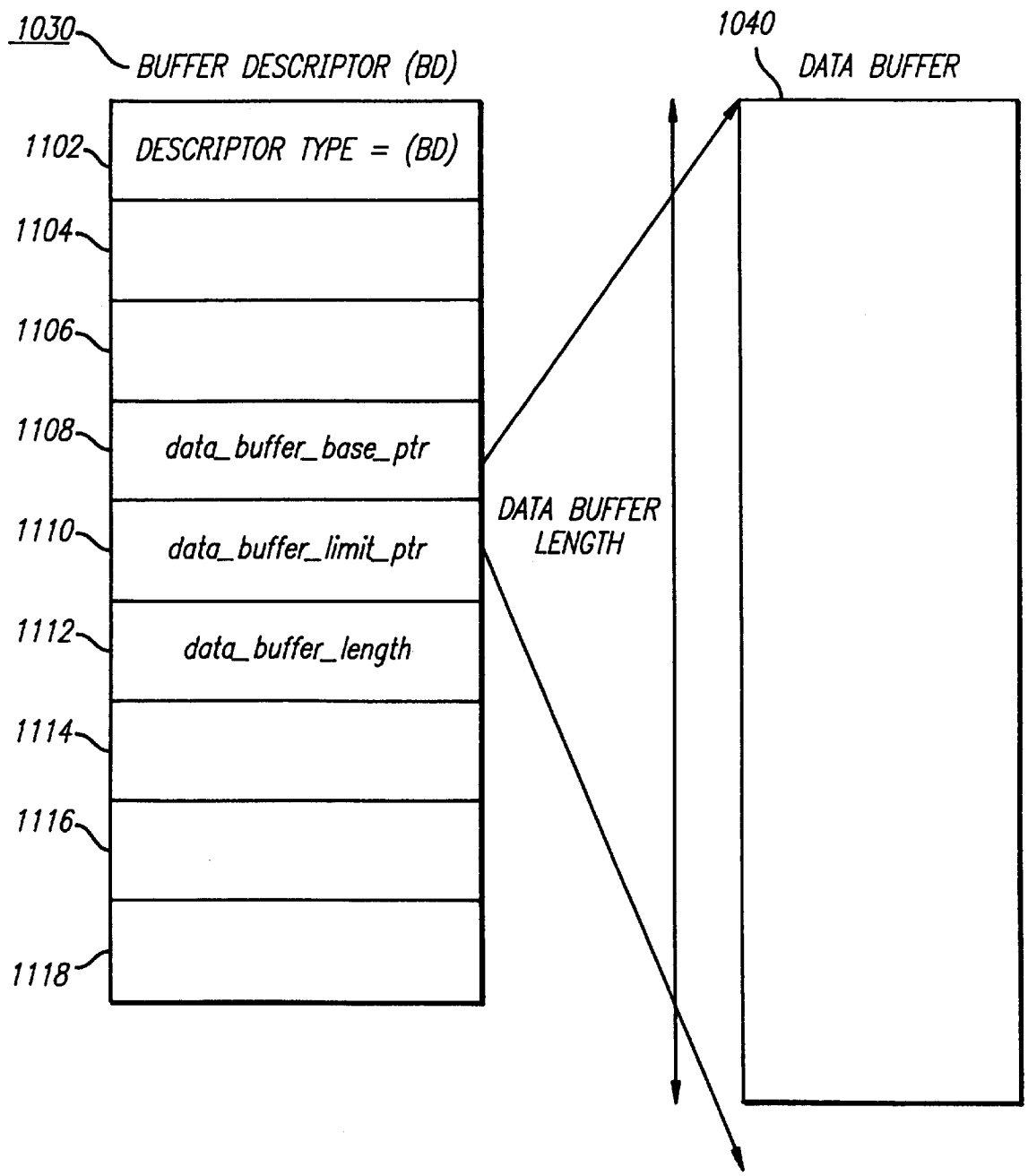
FIG. 11 shows a format of a buffer descriptor, which is a part of the message of FIG. 10.

FIG. 11 shows a format of a buffer descriptor 1030, which is a part of the message of FIG. 10. Buffer descriptor 1030 includes a descriptor type 1102, a data buffer base pointer 1108, a data buffer limit pointer 1110, and a data buffer length 1112. Descriptor type 1102 indicates that the descriptor is a buffer descriptor. Data buffer base pointer 1108 points to a base of data buffer 1140 in memory. Data buffer limit pointer 1110 points to an end of data buffer 1140. Data buffer length 1108 is the length of data buffer 1040.

As discussed above, the present invention allows increased vertical and horizontal modularity of processes. FIGS. 13(*a*) and 13(*b*) show some examples of vertical modularity that can be achieved in the present invention. FIG. 13(*a*) shows an example of NFS distributor process 316 of FIG. 3 which uses the shared memory queueing system (QIO) to communicate with TCP/IP process 146. TCP/IP process 146, in turn, uses the shared memory queueing system to communicate with one of driver/interrupt handlers 338 (e.g., LAN driver 158 of FIG. 1). As discussed above, communication through QIO allows each of these processes to be implemented as a separate process and to communicate with other processes without having to lose time due to duplication of data. Such a vertical division of processes improves modularity and ease of maintenance of processes. FIG. 13(*b*) shows vertical modularity between ODBC server process 214 and disk process 122 of FIG. 2. Again, use of a shared memory queueing system allows these processes to be implemented separately without having to duplicate data passed between the processes. Other examples of vertical modularity are shown in the figures and still others should be understood by persons or ordinary skill in the art in light of the above discussion.

Figure 14A:
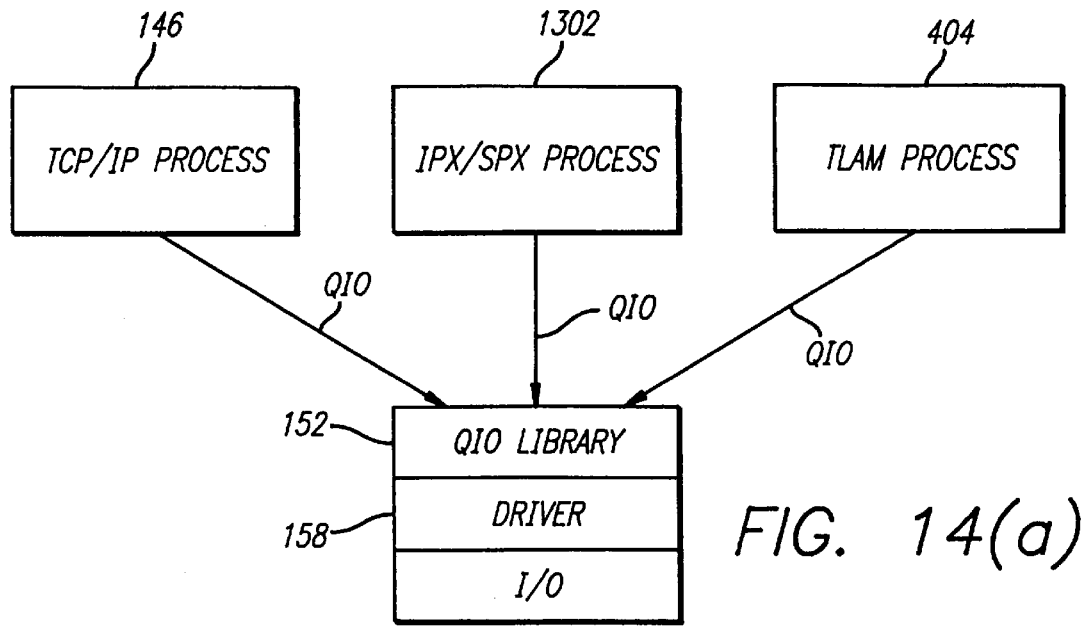
FIGS. 14(a), 14(b), and 14(c) show examples of horizontal modularity achieved with the present invention.
Figure 14B:
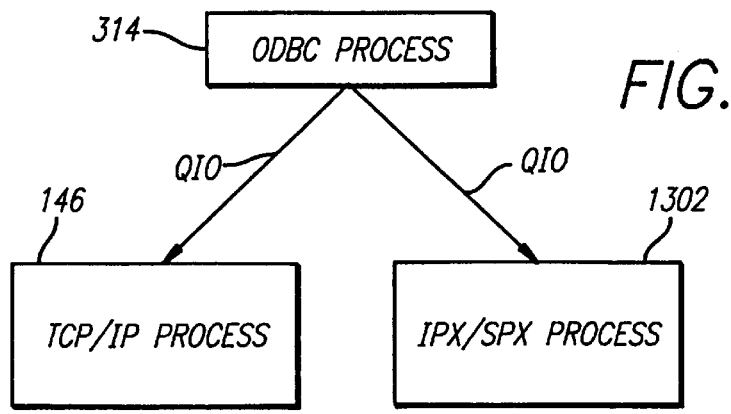
Figure 14C:
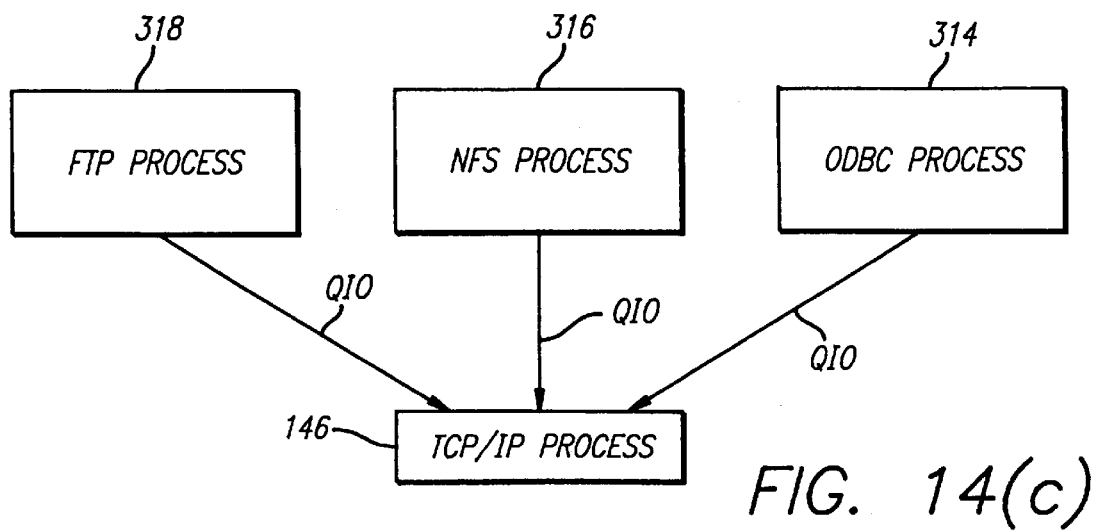

FIGS. 14(a), 14(b), 14(c) show examples of horizontal modularity achieved in the present invention. FIG. 14(a) shows TCP/IP protocol process 146 of FIG. 1, an IPX/SPX process 1302 and TLAM process 404. Each of these processes implements a different communication protocol and each of these processes uses the shared memory queueing system to communicate with LAN driver 158 (see FIGS. 4 and 5). Note that, in a preferred embodiment of the invention, LAN driver 158 is not a separate process itself, but can access the QIO library 152, and thus can access the shared memory queueing system.

FIG. 14(b) shows an example of ODBC distributor process 314, which can access either a TCP/IP process 146 or an IPX/SPX process 1302 using the shared memory queueing system. Use of QIO makes it easier for the processes to be written and maintained separately. In addition, time is not wasted by copying data passed between the processes.

FIG. 14(c) shows FTP server process 318, NFS distributor process 316, and ODBC distributor process 314, each of which can access TCP/IP process 146 via the shared memory queueing system. Again, use of a shared memory queueing system increases the modularity and ease of maintenance of the processes and allows data to be passed between the processes without duplicating the data, thus increasing the execution speed of the system. Other examples of horizontal modularity are shown in the figures and still others should be understood by persons or ordinary skill in the art in light of the above discussion.

In summary, use of a shared memory queueing system increases the speed of operation of communication between processes in a single processor and, thus, increases the overall speed of the system. In addition, use of a shared memory queueing system frees programmers to implement both vertical modularity and horizontal modularity when defining processes. This increased vertical and horizontal modularity improves the ease of maintenance of processes while still allowing efficient transfer of data between processes and between processes and drivers. Moreover, the described embodiment includes a messaging system in which data is copied during transmission. Such copying is desirable, e.g., to ensure fault tolerance. Execution speed lost by copying messages between processors is acceptable because of the added reliability gained by checkpointing these inter-processor transmissions.

In describing the preferred embodiments, a number of specific technologies used to implement the embodiments of various aspects of the invention were identified and related to more general terms in which the invention was described. However, it should be understood that such specificity is not intended to limit the scope of the claimed invention.

What is claimed is:

1. A method of transferring data between first and second processes in a fault-tolerant data processing system having at least a first and a second processor, comprising the steps of:

dividing a function to be performed by the fault-tolerant data processing system between the first process and the second process so that a transfer of data is required between the first and second processes;

creating an input queue for the second process in a memory segment shared by the first and second processes, the input queue having a data field describing whether the second process should be awakened; and determining whether the transfer of data between the first and second processes requires checkpointing;

responsive to a positive determination that the transfer of data requires checkpointing:

checkpointing the data to be transferred, the step of checkpointing comprising the step of copying the data to be transferred;

responsive to a negative determination that the transfer of data requires checkpointing:

storing, by the first process in the input queue of the second process, a pointer in the shared memory segment pointing to the data to be transferred; and consuming, by the second process, the data pointed to by the pointer stored in the input queue of the second process.

2. The method of claim 1, wherein the determination that the transfer of data between the first and second processes requires checkpointing is positive when the first and second processes are respectively executing on the first and second processors.

3. The method of claim 1, wherein the determination that the transfer of data between the first and second processes requires checkpointing is negative when the first and second processes are both executing on the first processor.

4. The method of claim 1 wherein the determination that the transfer of data between the first and second processes requires checkpointing is negative when the first and second processes are engaged in Local Area Network (LAN) protocol processing.

5. A method for improving the speed and efficiency of a fault-tolerant computing system having a plurality of processors, comprising the steps of:

dividing a function to be performed by the fault-tolerant computing system between a first process and a second process;

providing a shared memory space accessible to the first and second processes;

creating an input queue in the shared memory space for the second process the input queue having a data field describing whether the second process should be awakened;

duplicating data transferred from the first to the second process when the first and second processes are executing on separate processors of the plurality of processors; and sending pointers to data located in the shared memory space to transfer data from the first to the second process when the first and second processes are executing on the same processor of the plurality of processors by storing pointers to the data located in the shared memory space in the input queue for the second process.

6. The method of claim 5, wherein the step of duplicating data transferred between the first and second processes comprises the steps of:

creating a second input queue for the second process; and copying the duplicate data from the first process into the second input queue for the second process.

7. A method for increasing the modularity and efficiency of a process performed by a fault-tolerant computer having a processor, comprising the steps of:

dividing the process into a plurality of sub-processes in communication with each other and executing on the processor;

providing a common memory space accessible to the plurality of sub-processes;

creating a plurality of input queues in the common memory space wherein an input queue is associated with each of the plurality of sub-processes and each input queue has a data field describing whether the sub-process should be awakened; and storing a pointer to data in the common memory space to be transferred to a sub-process in an input queue of the sub-process.

8. The method of claim 7, further comprising the step of:

communicating among the plurality of sub-processes in series.

9. The method of claim 7, wherein a lower-level process is also executing on the processor and further comprising the step of:

arranging the plurality of sub-processes to communicate in parallel with the lower-level process.

10. The method of claim 9, wherein the sub-processes communicating in parallel comprise an implementation of an open systems interconnect (OSI) seven-layer communication protocol.

* * * * *